United States Patent
Manfredotti

(10) Patent No.: US 7,553,533 B2
(45) Date of Patent: *Jun. 30, 2009

(54) HIGH-DAMPING ABSORBING COATING

(75) Inventor: Thomas Manfredotti, La Colle sur Loup (FR)

(73) Assignee: Eurocopter, Marignane (FR)

( * ) Notice: Subject to any disclaimer, the term of this patent is extended or adjusted under 35 U.S.C. 154(b) by 486 days.

This patent is subject to a terminal disclaimer.

(21) Appl. No.: 10/569,405

(22) PCT Filed: May 10, 2005

(86) PCT No.: PCT/FR2005/001160

§ 371 (c)(1),
(2), (4) Date: Feb. 23, 2006

(87) PCT Pub. No.: WO2005/121596

PCT Pub. Date: Dec. 22, 2005

(65) Prior Publication Data

US 2006/0246257 A1    Nov. 2, 2006

(30) Foreign Application Priority Data

May 13, 2004    (FR)    .................... 04 05165

(51) Int. Cl.
*B32B 3/24*    (2006.01)
*F16M 13/00*    (2006.01)
*F16F 7/12*    (2006.01)

(52) U.S. Cl. .................. 428/134; 428/156; 428/139; 428/140; 181/207; 181/208; 181/209; 267/292; 267/141; 248/562; 248/564; 248/609; 248/611; 248/621; 248/626; 248/627; 248/632; 248/633; 248/634

(58) Field of Classification Search ................. 428/156, 428/139, 140, 134; 181/207, 208, 209; 267/292, 267/141; 248/562, 564, 609, 611, 621, 626, 248/627, 632, 633, 634
See application file for complete search history.

(56) References Cited

U.S. PATENT DOCUMENTS

| | | | | |
|---|---|---|---|---|
| 4,353,433 A | * | 10/1982 | Mohrenstein-Ertel et al. | .... 181/207 |
| 6,447,871 B1 | * | 9/2002 | Hawkins | ...................... 428/67 |
| 2008/0145621 A1 | * | 6/2008 | Manfredotti | ................. 428/178 |

FOREIGN PATENT DOCUMENTS

| | | |
|---|---|---|
| DE | 41 17 740 | 7/1992 |
| FR | 2 838 173 | 10/2003 |
| WO | WO 02/43047 | 5/2002 |

* cited by examiner

*Primary Examiner*—William P Watkins, III
(74) *Attorney, Agent, or Firm*—Young & Thompson

(57) ABSTRACT

The present invention relates to an absorbent covering having high damping power, the covering being secured to a structure (20) and being provided with an absorbent layer (10) of elastic material (4). Remarkably, said absorbent layer (10) comprises a dissipater mesh arranged in the elastic material (4) and constituted by a plurality of nodes (2) and of dissipater elements (1), which dissipater elements are advantageously elliptical in shape.

13 Claims, 1 Drawing Sheet

HIGH-DAMPING ABSORBING COATING

FIELD OF THE INVENTION

The present invention relates to an absorbent covering having high damping power, making it possible to reduce or even eliminate dynamic deformation of a structure as generated by vibration or by impacts, for example.

More particularly, the absorbent covering of the invention is preferably intended for mounting on board a rotorcraft. In particular when installed on the walls of its cabin, the absorbent covering attenuates dynamic deformation of the walls so as to increase wall lifetime and reduce cabin noise.

Naturally, the invention is not limited to this particular application and it can be used in any other application where there is a desire to reduce the dynamic deformation of a body. Given its design, it is optionally possible to envisage disposing the absorbent covering on the walls of a washing machine, for example, where electrical household appliances of this kind are subjected to high levels of vibration.

BACKGROUND OF THE INVENTION

A first known system comprises a one-piece elastomer plate arranged on a structure. The damping power of the elastomer then reduces the dynamic deformations of the structure, regardless of the way in which the structure is stressed mechanically, the elastomer serving in particular to dissipate energy in the form of heat.

Nevertheless, the effectiveness of that first system is limited since, as a result, the oscillation of the structure induces only small movements in the elastomer. The amount of energy dissipated in the elastomer plate is thus small.

To improve that first system, it is common practice to use a second system. The second system comprises a visco-stressed elastomer, i.e. an elastomer plate having a top portion previously bonded onto a metal support. The bottom portion of the elastomer plate, remote from the top portion, is then secured to a structure.

During dynamic deformation, e.g. bending of the structure generated by vibration, the top face is held by the metal support. This additional boundary condition induces a state of internal stresses in the elastomer that is greater than in the preceding configuration. Consequently, the amount of vibratory energy dissipated in the elastomer plate is increased.

The second system is indeed more efficient than the first system. Nevertheless, for applications that require a large amount of vibratory energy to be dissipated, it is still not sufficient.

OBJECTS AND SUMMARY OF THE INVENTION

An object of the present invention is to propose an absorbent covering that enables a considerable amount of damping to be applied to dynamic deformations of a structure.

According to the invention, an absorbent covering having high damping power and fixed to a structure is provided with an absorbent layer of elastic material, in particular of elastomer. Remarkably, the absorbent layer comprises a dissipater mesh, arranged in the elastic material and constituted by a plurality of nodes and of dissipater elements.

Industrial manufacture of the dissipater mesh is made much easier when the mesh, and consequently also the nodes and the dissipater elements, is machined or molded as a single piece from a single block of deformable material, e.g. a plastics material.

In addition, and preferably, the bottom ends of the nodes emerge from the elastic material. The absorbent layer is then spaced apart from the structure, this absorbent layer being secured to the structure solely via the nodes.

Thus, dynamic deformation of the structure leads to differential displacements of the nodes. The dissipater elements are then stressed, which has the effect of changing their shapes.

In this way, the amount of energy dissipated in the absorbent layer is large, since the elastic material is deformed firstly by a lever arm effect caused by the nodes holding the dissipater elements away from the structure, and secondly by the dissipater elements sharing the stresses transmitted by the nodes throughout the elastic material while amplifying them by a geometrical effect. In order to optimize this amplification, at least one dissipater element is advantageously elliptical in shape, with each ellipse being connected to two nodes disposed at the points of intersection between the periphery of the ellipse and its major axis.

In a manner that is remarkable, and in order to make it easier to mount the absorbent covering on a structure, the bottom face of the bottom end of each node, i.e. the face that comes into contact with the structure, is preferably covered in a self-adhesive.

In addition, in the invention, the elastic material includes a plurality of recesses so as to enable it to work as efficiently as possible. These recesses then make it possible to reduce the weight of the absorbent covering significantly.

Furthermore, in order to optimize its dissipative efficiency, the elastic material and the dissipater elements are preferably identical in height.

In a first embodiment, the dissipater mesh presents a repeated square pattern, i.e. a pattern presenting four nodes and five dissipater elements.

In a second embodiment, the dissipater mesh has a repeated triangular pattern provided with three nodes and three dissipater elements.

In a variant of the invention, the absorbent covering is visco-stressed. It thus includes a rigid backing plate, the absorbent layer then being arranged between said rigid backing plate and the structure.

In this configuration, the absorbent covering is more advantageously provided with an elastic backing plate disposed between the rigid backing plate and the absorbent layer.

BRIEF DESCRIPTION OF THE DRAWINGS

The invention and its advantages appear in greater detail from the following description of embodiments given by way of illustration and with reference to the accompanying figures, in which.

MORE DETAILED DESCRIPTION

Elements that appear in a plurality of distinct figures are given the same reference in each of them.

Figure 1:
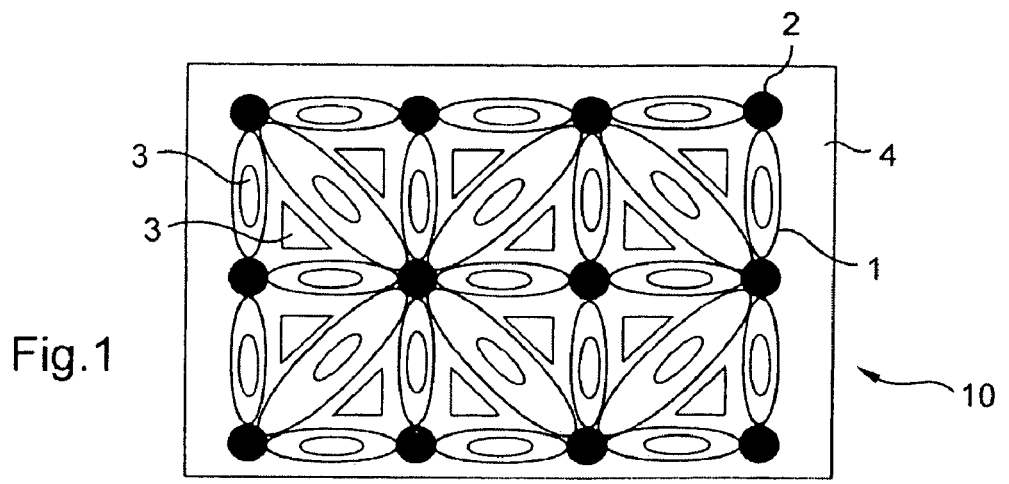
FIG. 1 is a plan view of an absorbent layer provided with a dissipater mesh.

FIG. 1 shows an absorbent layer 10 of elastic material 4, preferably of elastomer, provided with a dissipater mesh of deformable material, e.g. of plastics material.

The mesh is constituted by a plurality of nodes 2 and of dissipater elements 1. By way of example, the dissipater elements are made up of ellipses, however they could have any other shape (bar-shaped, lozenge-shaped, . . . ) depending on requirements, and without going beyond the ambit of the invention.

Furthermore, a plurality of recesses 3 are distributed over the elastic material 4 as a whole.

Figure 2:
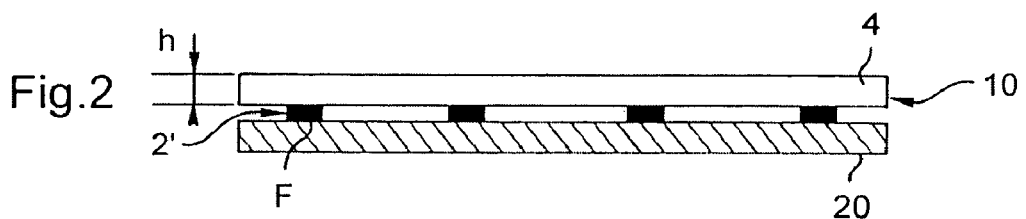
FIG. 2 is a side view of a structure provided with an absorbent layer of the invention.

With reference to FIG. 2, the absorbent layer 10 is secured to a structure 20.

To do this, the end 2' of each node 2 emerges from the elastic material 4. The bottom face F thereof situated outside the elastic material 4 is then bonded to the structure 20, e.g. by adhesive, so as to hold the elastic material 4 away from the structure 20.

In order to facilitate bonding, and thus assembly, the bottom face F of each end 2' is covered in a self-adhesive material.

It can be observed that it is particularly easy to secure the absorbent layer 10 onto the structure 20. Thus, it can be installed on any type of existing wall, e.g. the ceiling of a rotorcraft cabin, without much extra cost.

In addition, the dissipater elements 1 and the elastic material 4 are identical in height h, which height is relatively small. The absorbent layer 10 is thus relatively compact, thereby enabling it to be mounted on a structure, even when the structure is in a confined space.

Furthermore, from a functional point of view, when the structure 20 is deformed under the effect of vibration, regardless of the mode in which stress is applied (traction, bending, . . . ), the nodes 2 move, thereby imparting motion to the elastic material 4. This motion is amplified by the lever arm effect due to the distance that then exists between the elastic material 4 and the structure 20.

In addition, the effect of the nodes 2 moving is to change the shape of the dissipater elements 1. As described below, it is by shortening and lengthening the elliptically-shaped dissipater elements 1 that the elastic material 4 is subjected to amplified deformation.

The combined effect of the dissipater elements 1 and the nodes 2 thus gives the absorbent layer 10 high damping power that enables any dynamic deformation of the structure 20 to be greatly diminished.

Figure 3:
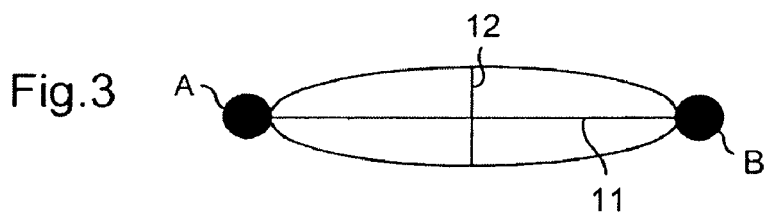
FIG. 3 is a view of a dissipater element of elliptical shape.

FIG. 3 is a view of an elliptically-shaped dissipater element 1 connected to two nodes A and B. These nodes A and B are located at the intersections between the periphery of the ellipse and its major axis 11.

In this manner, the efficiency of the covering of the invention is optimized. By using an elliptical shape, a small amount of shortening along the major axis 11 leads to a considerable lengthening along the minor axis 12. Thus, relatively small stress applied to the ellipse along its major axis 11 is amplified considerably, leading to a large amount of deformation of its minor axis 12. This effect, multiplied by the number of ellipses in the dissipater mesh, gives the covering of the invention high damping power.

Figure 4:
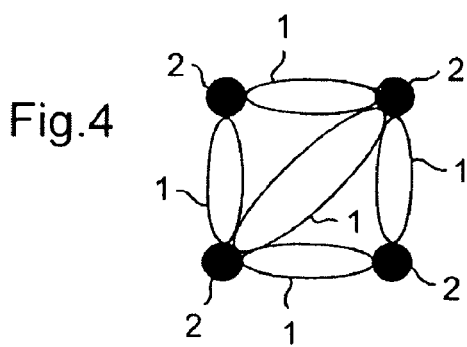
FIG. 4 is a plan view of a dissipater mesh in a first embodiment.

FIG. 4 shows a first embodiment. The dissipater mesh then comprises a repeated square pattern.

The square pattern comprises four nodes 2 and four dissipater elements 1 respectively constituting the corners and the sides of a square. In addition, a fifth dissipater element is disposed along one of the diagonals of the square.

Figure 5:
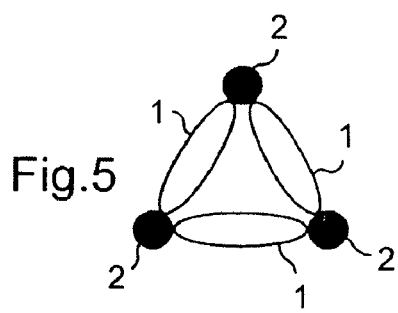
FIG. 5 is a plan view of a dissipater mesh in a second embodiment.

FIG. 5 shows a second embodiment. In this embodiment, the repeated pattern of the dissipater mesh is triangular. Three nodes 2 and three dissipater elements 1 then represent respectively the corners and the sides of a triangle.

Depending on the level of stress applied to the structure, one or other embodiment is preferred.

Figure 6:
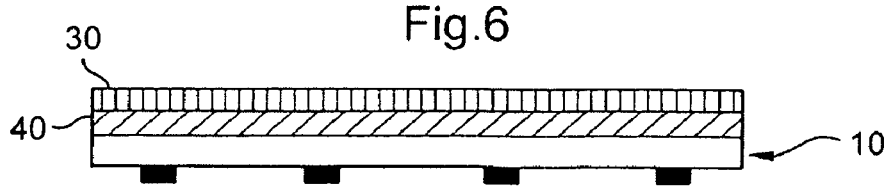
FIG. 6 is a side view of an absorbent covering in a variant of the invention.

FIG. 6 shows a variant of the invention.

In order to apply visco-stress to the elastic material 4, the absorbent covering includes a rigid backing plate 30.

In addition, in order to leave maximum latitude for displacement of the nodes 2 in the absorbent layer, an elastic backing plate 40 is arranged between the rigid backing plate 30 and the absorbent layer 10.

Naturally, implementation of the invention can be subjected to numerous variations. Although several embodiments are described above, it will readily be understood that it is not conceivable to identify exhaustively all possible embodiments. It is naturally possible to envisage replacing any of the means described by equivalent means without thereby going beyond the ambit of the present invention.

What is claimed is:

1. An absorbent covering having high damping power, said covering being secured to a structure and including an absorbent layer, said absorbent layer comprising:
   an elastic material; and
   a dissipater mesh arranged in said elastic material, said dissipater mesh comprising a plurality of dissipater elements and a plurality of nodes connecting respective ones of said dissipater elements, said dissipater elements each having a shape of an ellipse.

2. The covering according to claim 1, wherein bottom ends of said nodes extend beyond said absorbent layer so that the absorbent layer is spaced apart from said structure, said absorbent layer being secured to said structure solely via the nodes.

3. The covering according to claim 1, wherein bottom faces of said bottom ends are covered in a self-adhesive material.

4. The covering according to claim 1, wherein said elastic material is made of elastomer.

5. The covering according to claim 1, wherein said elastic material further includes a plurality of recesses.

6. The covering according to claim 1, wherein said dissipater mesh has a repeated square pattern.

7. The covering according to claim 1, wherein said dissipater mesh has a repeated triangular pattern.

8. The covering according to claim 1, wherein said ellipse is connected to two nodes located at the points of intersection between the periphery of the ellipse and its major axis.

9. The covering according to claim 1, including a rigid backing plate, said absorbent layer then being arranged between said structure and said rigid backing plate.

10. The covering according to claim 9, including an elastic backing plate disposed between said rigid backing plate and said absorbent layer.

11. The covering according to claim 1, wherein said elastic material and said dissipater elements are identical in height.

12. The covering according to claim 1, wherein said dissipative mesh is machined as a single piece from a single block of deformable material.

13. The covering according to claim 1, wherein said dissipative mesh is obtained by molding a one-piece block of deformable material.

\* \* \* \* \*